United States Patent [19]
Ware et al.

[11] Patent Number: 5,669,810
[45] Date of Patent: Sep. 23, 1997

[54] APPARATUS AND PROCESS FOR TREATING PORK BELLIES

[75] Inventors: Kenneth Marvin Ware, Cedar Bluff, Miss.; Jack Wayne France, Sr., Little Rock, Ark.; Jeffrey A. Williams, Calhoun, Ga.

[73] Assignee: Sara Lee Corporation, Winston-Salem, N.C.

[21] Appl. No.: 600,329

[22] Filed: Feb. 13, 1995

[51] Int. Cl.⁶ ................................................ A22C 15/00
[52] U.S. Cl. ............................................................. 452/193
[58] Field of Search .................................. 452/193, 187, 452/149

[56] References Cited

U.S. PATENT DOCUMENTS

| | | | |
|---|---|---|---|
| 1,450,667 | 4/1923 | Dvorak | 452/193 |
| 1,916,464 | 7/1933 | Covey | 452/193 |
| 2,217,844 | 10/1940 | Lee | 452/193 |
| 5,334,088 | 8/1994 | Le-Normand et al. | 452/193 |
| 5,423,721 | 6/1995 | Roush et al. | 452/193 |

*Primary Examiner*—Willis Little
*Attorney, Agent, or Firm*—Petree Stockton, L.L.P.

[57] ABSTRACT

Apparatus and process for treating pork bellies, the apparatus utilizing a frame carrying a belly supporting surface, a belly treating station made up of various belly engaging devices, a comb positionable in the treated belly flank side after the flank side has been engaged at the belly treating assembly, and an accumulation table carried by the frame for holding the treated and combed bellies after removal from the belly treating station. The belly treating assembly includes the flank side movable engaging stop, fatback side and lower side presses movable substantially horizontally to engage and compress the belly flank side, and a hold down assembly engaging the belly face and resisting its upward bowing or movement when the flank side is compressed. A belly hanging structure is positioned adjacent the accumulation table for receiving and supporting the combed bellies so that the bellies will lengthen and square during the smoking process. The process involves positioning the pork belly on a combing table with the flank side forming the leading edge, applying pressure to the fatback and lower sides to reduce the length of the flank side leading edge, combing the leading edge while in the reduced length condition to maintain the leading edge in a reduced length condition, and hanging the belly by the comb for subsequent processing to induce elongation and symmetry.

15 Claims, 7 Drawing Sheets

APPARATUS AND PROCESS FOR TREATING PORK BELLIES

FIELD OF THE INVENTION

The present invention relates to an apparatus and process for treating pork bellies and, more particularly, to providing a mechanism and technique for reconfiguring to some degree a standard cut pork belly to induce elongation and symmetry and thereby increase yield and quality.

DESCRIPTION OF THE PRIOR ART

In the commercial preparation of bacon, pork bellies are cut from hogs, along with the fatback and ribs, and are graded into groups of 12 pounds, 12 to 14 pounds, 14 to 16 pounds, 16 to 18 pounds and 18 to 20 pounds. The skins of the bellies are then removed, and they are sent to an injector where they are injected with a 10% curing solution. After they leave the injector, they go to the combing table.

The usual or conventional process to shape the naturally curved pork bellies is for workers to pull and push on the edges of the belly to correct the unwanted curvature. Since a single belly from a hog is formed in two asymmetrical parts, the curvature is different and the technique of straightening is thus more involved and difficult. Once the bellies are straightened to the extent they can be, they are engaged by a comb, a device having curved tynes which will pierce the flesh and provide a handle so that the belly can be lifted and hung by the end of the handle. A common belly is about 13 inches in length, and when it is subjected to the combing operation, its effective or usable length is reduced to about 11 inches because of the positioning of the tynes of the comb from the side of the belly. During the cooking or smoking process, the belly will add the one or one and one-half inches that has been reduced by virtue of the combing as a result of the cooking.

Combing the belly is a manual operation with the operator engaging the belly with the tynes and physically forcing it into the flesh. Depending on the success of the straightening done prior to combing, the comb may be fairly close to the edge of the belly, thus resulting in little unused belly flesh left after the slicing operation or it may be more inwardly of the belly because of the edge irregularity and lack of straightening, thus leaving more waste after slicing.

With the present production process having the disadvantages of not being able to furnish perfectly shaped and squared bellies because of the manual operation and the meat waste resulting therefrom, there is a desire and need to develop an effective machine and process for improving efficiency, output, quality and reducing waste. It is to this need that the present invention is directed.

OBJECTIVES AND SUMMARY OF THE INVENTION

The purpose of the present invention, which will be described subsequently in greater detail, is to provide a process and apparatus for treating pork bellies that has all of the advantages of the prior art methods and more, and none of the disadvantages.

Another objective of the present invention is to provide an apparatus for carrying out the method of the present invention that has heretofore been unavailable.

Yet a further objective of the present invention is to provide a process of the type described which will shape the belly so that during the cooking process, it will become elongated and symmetrical.

Yet still another objective of the present invention is to provide a process that will enable far greater production than has heretofore been possible by use of the novel apparatus described herein.

Yet still another further objective of the present invention is to provide a process that will straighten the natural curvature of the belly and thereby eliminate wrinkles at the press which result in thin sections or voids in strips of bacon that have to be removed for higher grades and are thus undesirable.

These objectives are accomplished by the provision of a process for treating pork bellies that includes positioning a pork belly on a combing table with the flank side forming the leading edge, applying pressure to the fatback and lower sides to reduce the length of the leading edge, combing the leading edge while in the reduced length condition to maintain the leading edge in the reduced length condition, and hanging the belly by the comb for subsequent processing to induce elongation and symmetry. The apparatus for accomplishing the objectives set forth above includes a frame forming a combing table which has a belly supporting surface, a belly treating assembly which is formed by a flank side movable engaging stop, fatback side and lower side presses movable horizontally to compress the belly flank side, a hold down assembly engaging the belly face and resisting upward bowing of the belly face during the compression by the fatback side and lower side presses. A comb for positioning in the compressed belly flank side is utilized, and an accumulation table is carried by the combing table frame for holding the treated and combed bellies after removal from the belly treating assembly.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings.

The invention is capable of other embodiments and of being practiced and carried out in various ways. It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development.

It is important that the claims be regarded as including such equivalent processes and products resulting therefrom that do not depart from the spirit and scope of the present invention. The application is neither intended to define the invention of the application, which is measured by its claims, nor to limit its scope in any way. Thus, the objectives of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings, wherein like characters of reference designate like parts throughout the several views.

DESCRIPTION OF PREFERRED EMBODIMENTS

Figure 1:
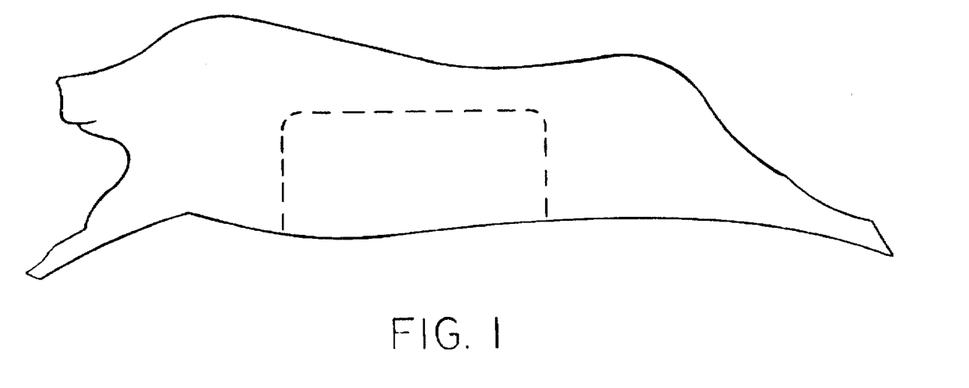
FIG. 1 is a side elevational view of an extended hog carcass wherein the pork belly for forming bacon is outlined in broken lines.
Figure 2A:
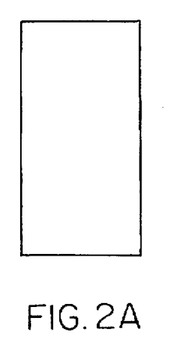
FIG. 2 is a series of schematic, plan view of a pork belly being treated by the apparatus of and in accordance with the process of the present invention.
Figure 2B:
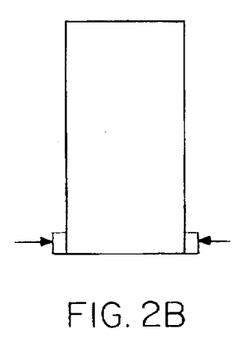
Figure 2C:
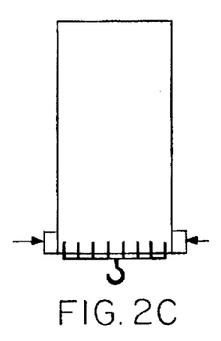
Figure 2D:
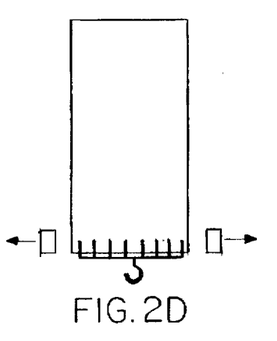
Figure 2E:
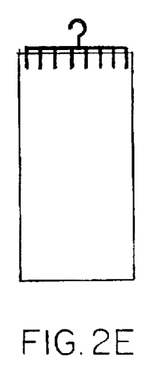
Figure 2F:
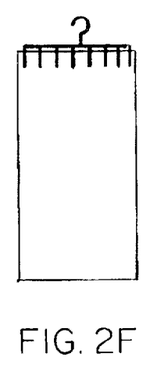
Figure 2G:
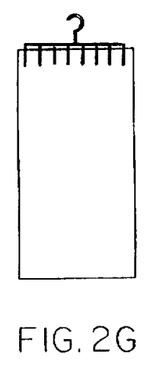

Referring now to the drawings and particularly to FIG. 1, a hog carcass shown generally as 20 is divided into sections to emphasize the location on the hog where pork bellies are obtained. Since the belly extends from the side under and around and up the other side of the hog, it is formed in two sections, each having a curvature resulting from the configuration of the hog. The two belly parts taken from a single hog are generally asymmetrical in configuration.

FIG. 2 diagrammatically illustrates the initial configuration of one side of a belly and the treatment it undergoes in the present invention to induce elongation and symmetry thereby improving bacon yield and quality. The natural curvature of the belly causes it to be shaped in a generally trapezoidal configuration as reflected in (a). Utilizing the present inventive process, the larger or flank side is compressed to shorten the length of that side as shown in (b). While in the shortened condition, this edge is combed as shown in (c) so that it retains its reduced length when pressure is removed as shown in (d). The belly then is hung from its hanger end 24 as shown in (e) and exposed to the cooking or smoking process at that time. As that process continues, it begins to lengthen as shown in (f) and square up in configuration. At the end of the cooking or smoking process, the belly is essentially rectangular in shape and longer than it was in the beginning as a result of the reshaping and cooking as shown in (g). The extended length (g) results in better yield and fewer defects.

Figure 3:
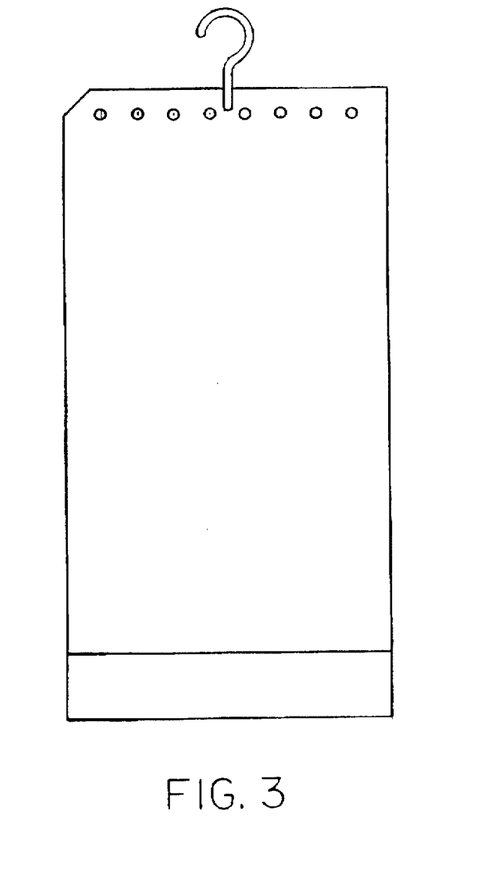
FIG. 3 is a side elevational view of a belly hanging by a comb and process in accordance with the present invention.
Figure 4:
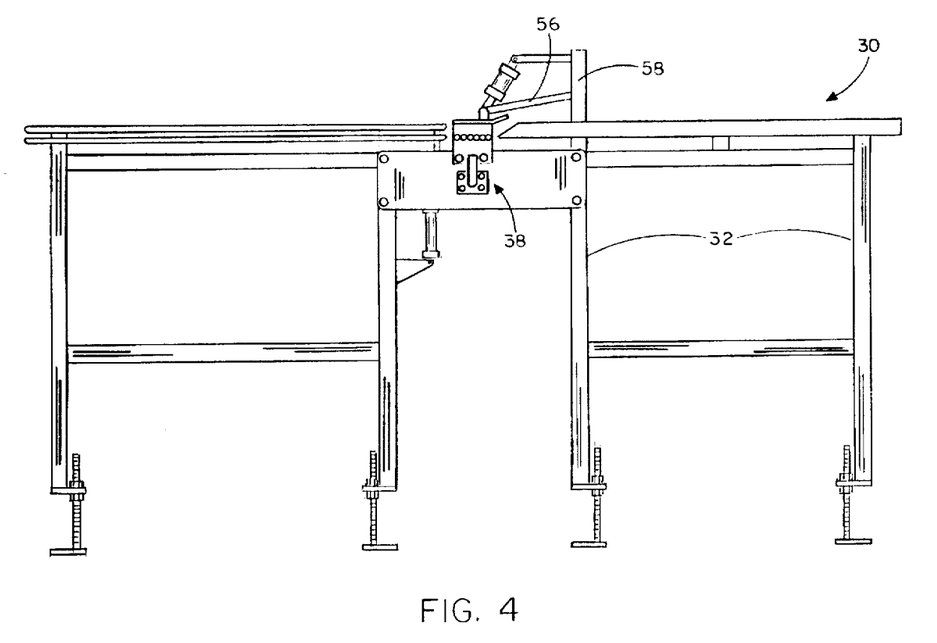
FIG. 4 is a side elevational view of the apparatus of the present invention.
Figure 5:
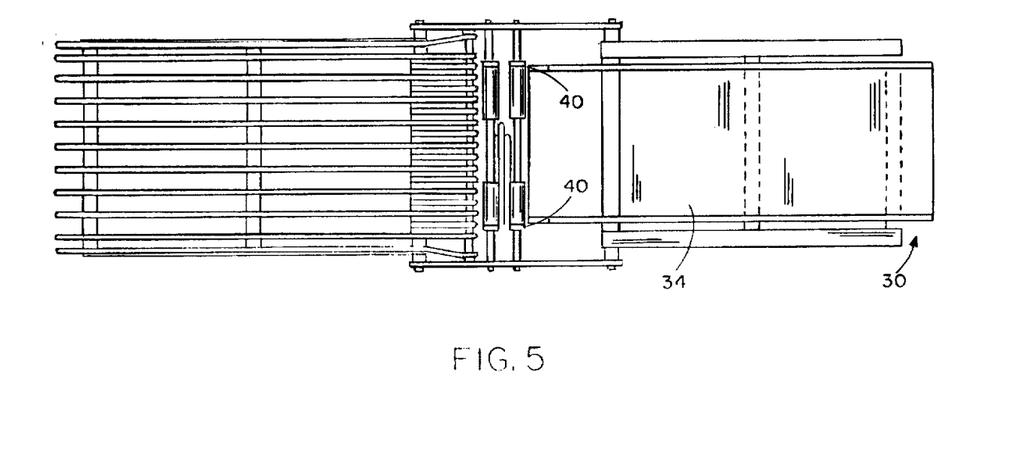
FIG. 5 is a plan view of the apparatus illustrated in FIG. 4.

FIG. 3 illustrates the approximate lengthening of the belly along the fatback and lower sides as a result of the new combing and subsequent cooking or smoking process. Yield increases of up to 8% have been noted during the utilization of this new process. Moreover, a larger quantity of better quality bacon is produced, again reflecting higher efficiencies.

Figure 6:
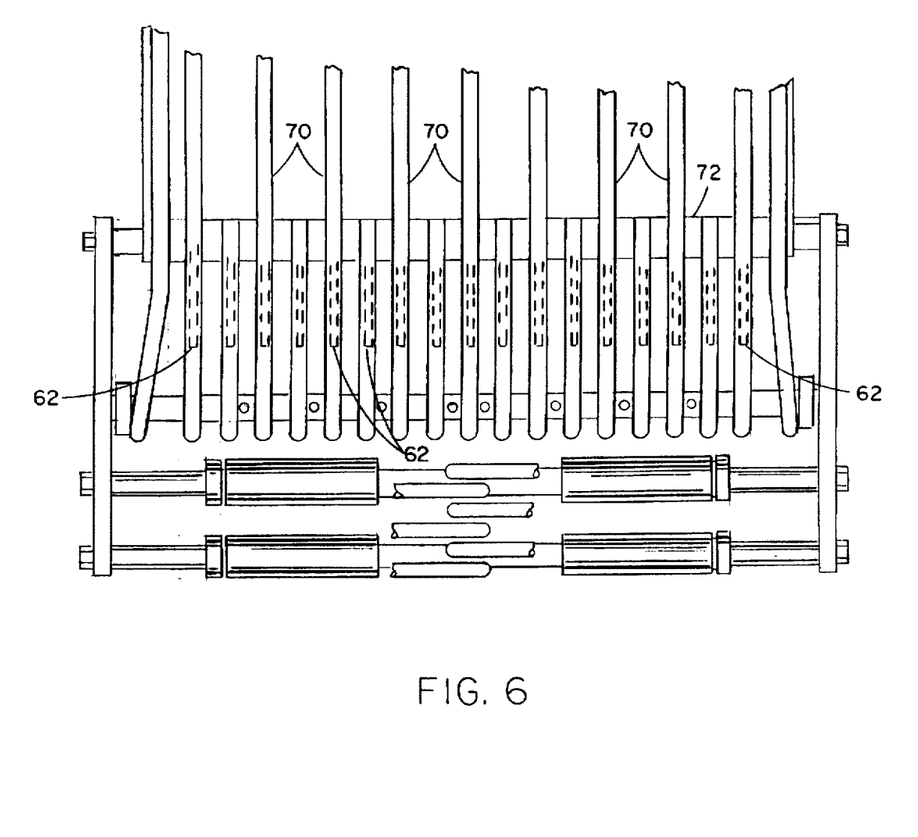
FIG. 6 is an enlarged and fragmentary view of compressing area and the fatback side and lower side presses.
Figure 7:
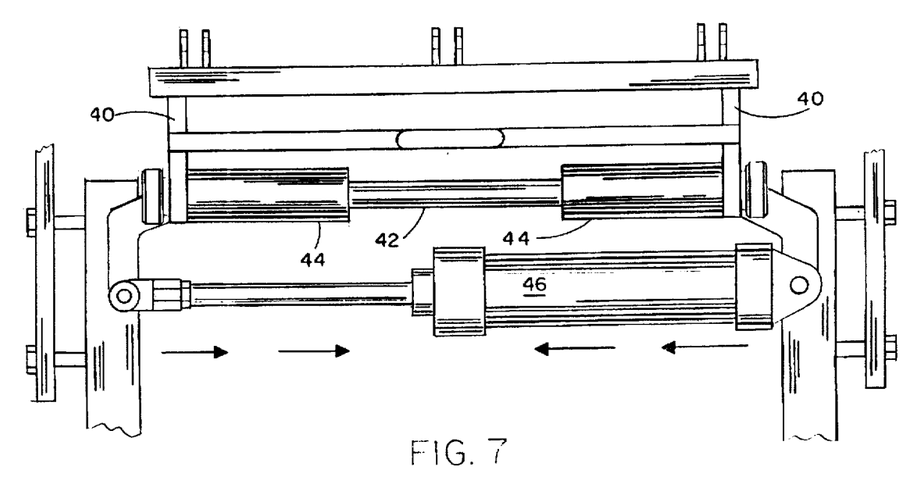
FIG. 7 is a front elevational and fragmentary view of the compressing area of the apparatus shown in FIGS. 4 and 5 including the activating cylinder for moving inwardly and retracting outwardly the side presses.

The apparatus comprising a part of the present invention is shown generally as 30 and includes a frame 32, a belly supporting surface 34, and a belly treating assembly shown generally as 38. The assembly includes side presses 40 that are best illustrated in FIGS. 6 and 7. Two guide rods 42 carry movable sleeves 44 which are attached to presses 40. Activation of cylinder 46 causes movement of sleeves 44 on guide rods 42 to either move inwardly and squeeze or compress the flank side leading edge or release that pressure and disengage the presses 40 from the belly.

Figure 8:
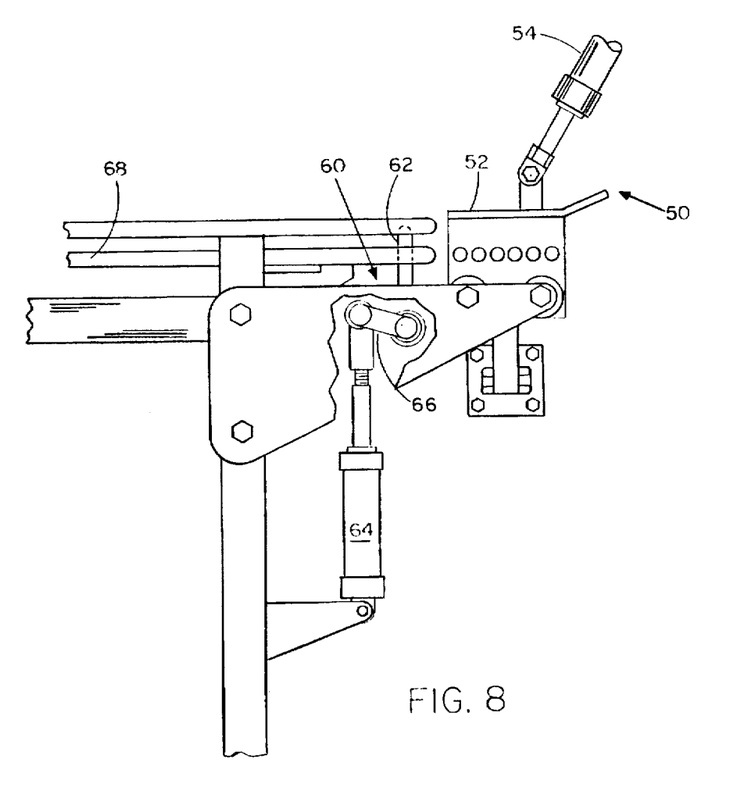
FIG. 8 is a side elevational and fragmentary view of the belly hold-down assembly and belly engaging stop of the machine comprising the present invention.

A hold down assembly shown generally as 50 includes an angularly configured plate 52 that receives and engages the belly face to maintain it of a consistent thickness. A cylinder 54 can adjust the height of plate 52 and maintain a consistent pressure against the face of a belly taking into consideration that thicknesses of bellies passing through the apparatus vary. A linkage 56 assists cylinder 54 in that operation, both of which are attached to a support 58 secured to frame 32.

A belly stop assembly shown generally as 60 includes a movable stop 62, operable by a cylinder 64 connected to a fixed linkage 66 so that stop 62 will move counterclockwise and below the surface of the belly supporting accumulation table 68 to allow the belly to be withdrawn from beneath plate 52. Stop 62 is movable between rods 70 that make up the accumulation table 68. All of the rods 70 are connected to a single roller 72 as best shown in FIG. 6.

Figure 10:
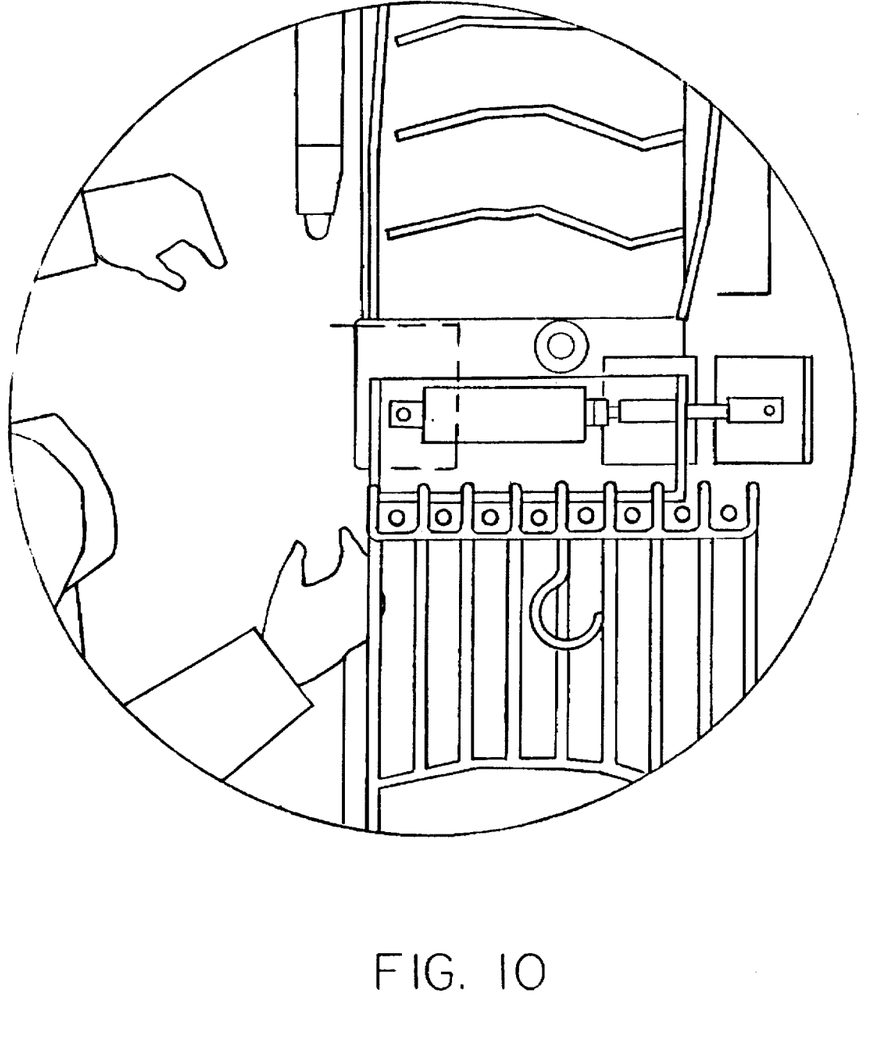
FIG. 10 is an enlarged view of the area encircled in FIG. 4.

In operation, a belly is introduced to the apparatus when it is placed on the belly supporting surface 34. Thereafter, it is urged into the belly treating assembly 38 until the flank side edge engages stop 62. Hold down assembly 50 has been adjusted to continue to exert the same amount of pressure on the face of the belly, and side presses 40 are then urged inwardly via the activation of cylinder 46 to squeeze or exert pressure in a horizontal direction to engage and compress the belly. The flank side holding plate 52 prevents the compression causing the upward bowing of the belly face and thereby results in a denser belly flank edge which removes wrinkles and thereby avoids voids or thin sections of bacon subsequently sliced from the belly. When the flank edge is in the reduced length condition, it receives a comb 73 best shown in FIG. 10 which goes into the flesh of the belly and retains it in the reduced length condition when pressure is removed. Comb 73 has a handle 72 which is used to pull the belly through the belly treating assembly 38 and subsequently to engage a supporting rod of a bacon tree for hanging and subsequent processing.

Figure 9:
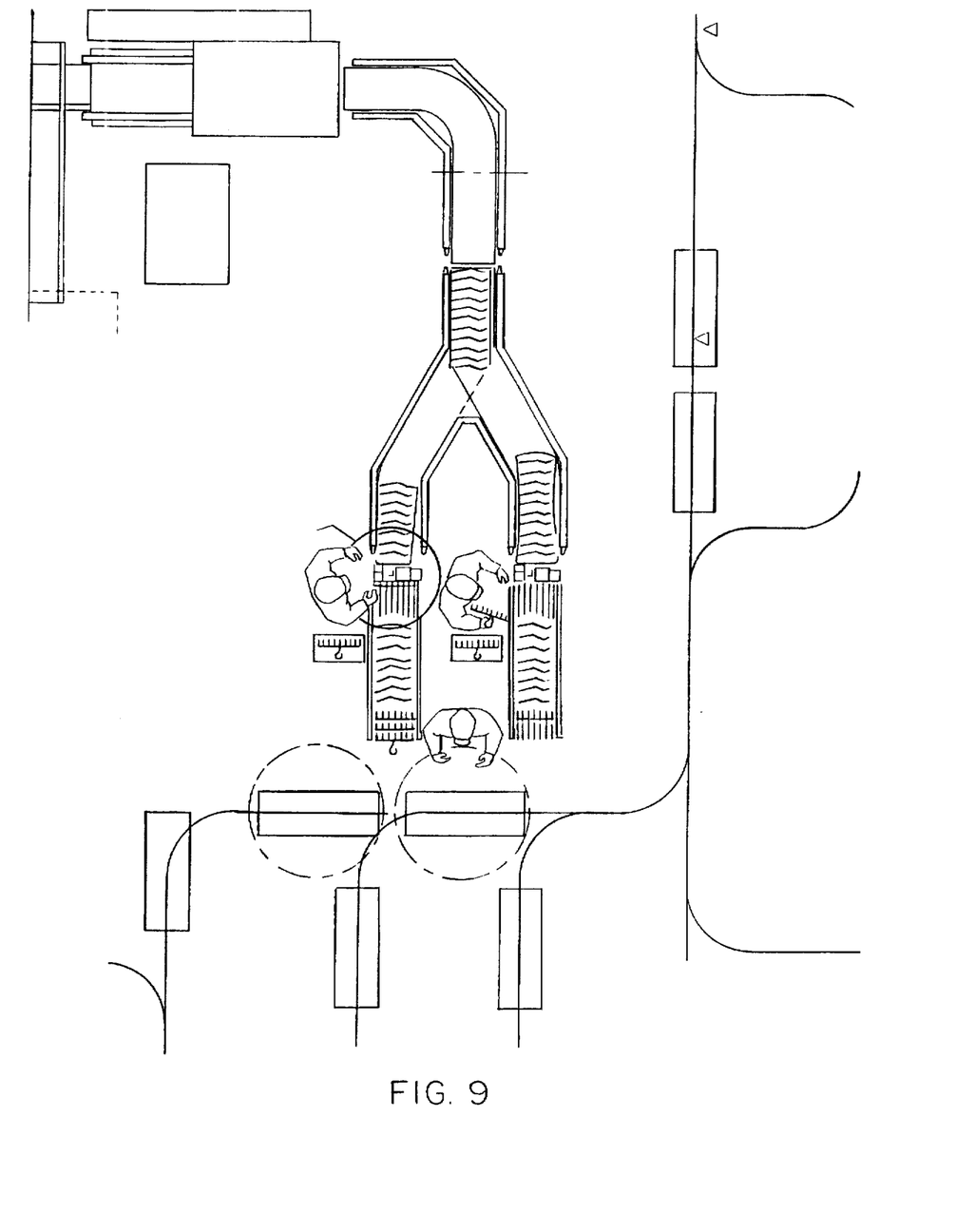
FIG. 9 is a plan view of the apparatus of the present invention being utilized at a dual station for processing pork bellies.

Apparatus 30 comprising the invention can be automated as shown in FIG. 9 whereby a single conveyor can feed multiple stations to maximize production. A movable conveyor introduces bellies to each apparatus 30 which carries sensing equipment (not shown) that will stop conveyor movement during the processing of a belly at the belly treating assembly. Additional sensing devices can reactivate the conveyor when the belly has been combed so that it will move on to the belly hanging station for subsequent removal from the accumulation table. Obviously, any number of machines comprising the present invention can be utilized in a manner similar to that disclosed in FIG. 9.

From the foregoing, it will be readily apparent that a process and apparatus for treating pork bellies followed and constructed in accordance with the present invention is well-adapted to attain the ends and objectives hereinbefore set forth. As various embodiments may be made of the invention, and as changes might be made in the embodiments above set forth, it is to be understood that all matters hereinbefore set forth and shown in the accompanying drawings are to be interpreted as illustrative and not in a limiting sense.

What is claimed is:

1. A process for treating pork bellies comprising the steps of: positioning a pork belly having a fatback side, a shoulder side, a flank side, a lower side and a top on a combing table with the flank side forming the leading edge; securing the fatback and lower sides and top of the front portion of the belly adjacent the leading edge; applying pressure to the fatback and lower sides to reduce the length of the leading edge; engaging the belly top to resist upward bowing of said belly top while pressure is applied to the fatback and lower sides; combing the leading edge while in the reduced length condition to maintain the leading edge in the reduced length condition; and hanging the belly by the comb for subsequent processing to induce elongation and symmetry.

2. A process for treating pork bellies wherein each belly has a fatback side, a shoulder side, a flank side, a lower side and top, the process comprising the steps of: positioning a pork belly on a combing table with the flank side forming a leading edge; securing the leading edge, the shoulder and flank sides; applying sufficient pressure to the shoulder and flank side while holding the belly top and leading edge to reduce the length of the flank side; combing the leading edge of the flank side while in the reduced length condition to maintain the flank side leading edge in the reduced length condition; and hanging the belly by the comb for subsequent processing to induce belly elongation and symmetry.

3. The process as claimed in claim 2 wherein the reduced length flank side leading edge is less than the length of the comb.

4. The process as claimed in claim 2 wherein the subsequent processing includes smoking.

5. The process as claimed in claim 2 wherein the subsequent processing includes subjecting the belly to a brine chill.

6. The process as claimed in claim 2 wherein the subsequent processing includes drying the belly.

7. The process as claimed in claim 4 wherein the subsequent processing includes subjecting the belly to a brine chill.

8. The process as claimed in claim 7 wherein the subsequent processing includes drying the belly.

9. Apparatus for treating a pork belly having a flank side, a shoulder side, a fatback side, a lower side, and a base, the apparatus comprising: a frame; a belly-supporting surface carried by the frame; belly treating means adjacent said supporting surface including a flank side movable engaging stop; fatback side and lower side presses moving substantially horizontally to engage and compress the belly, a hold down assembly engaging the belly face and resisting upward bowing of the belly face when the belly is compressed by the fatback side and lower side presses; a comb for positioning in the compressed belly flank side; and an accumulation table carried by the frame for holding the treated and combed bellies after removal from the belly treating means for further processing.

10. The apparatus as claimed in claim 9 wherein the accumulation table has an open ribbed floor and the flank side movable engaging stop has tynes that move between the ribs of the floor from below the floor to above the floor and against the belly flank side and back again.

11. The apparatus as claimed in claim 9 wherein the comb is positioned in the compressed belly flank side between the top press and the flank side movable engaging stop.

12. The apparatus as claimed in claim 10 wherein the comb is positioned in the compressed belly flank side between the top press and the flank side movable engaging stop.

13. The apparatus as claimed in claim 9 further comprising a belly hanging structure positioned adjacent the accumulation table for receiving and supporting the combed belly by the comb along the belly flank side whereby the belly will lengthen and square during the smoking process.

14. The apparatus as claimed in claim 13 wherein the accumulation table has an open ribbed floor and the flank side movable engaging stop has tynes that move between the ribs of the fllor from below the floor to above the floor and against the belly flank side and back again.

15. The apparatus as claimed in claim 13 wherein the comb is positioned in the compressed belly flank side between the top press and the flank side movable engaging stop.

* * * * *